(12) United States Patent
Puthillathe et al.

(10) Patent No.: US 9,704,214 B2
(45) Date of Patent: *Jul. 11, 2017

(54) RENDERING VIDEO DATA IN AN INFORMATION HANDLING SYSTEM BY CONVERTING THE VIDEO DATA TO BULK VIDEO DATA

(71) Applicant: DELL PRODUCTS, L.P., Round Rock, TX (US)

(72) Inventors: Chandrasekhar Puthillathe, Bangalore (IN); Rama Rao Bisa, Kandukur (IN)

(73) Assignee: Dell Products, L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/349,186

(22) Filed: Nov. 11, 2016

(65) Prior Publication Data

US 2017/0061572 A1    Mar. 2, 2017

Related U.S. Application Data

(63) Continuation of application No. 14/719,554, filed on May 22, 2015, now Pat. No. 9,558,529.

(51) Int. Cl.
*G06T 1/20* (2006.01)
*G06F 13/42* (2006.01)
*G06F 11/32* (2006.01)
*G06F 11/30* (2006.01)

(52) U.S. Cl.
CPC ............ *G06T 1/20* (2013.01); *G06F 11/3027* (2013.01); *G06F 11/3048* (2013.01); *G06F 11/3051* (2013.01); *G06F 11/3055* (2013.01); *G06F 11/327* (2013.01); *G06F 13/4282* (2013.01); *G06F 2213/0042* (2013.01); *G06T 2200/28* (2013.01); *G09G 2370/042* (2013.01)

(58) Field of Classification Search
None
See application file for complete search history.

(56) References Cited

U.S. PATENT DOCUMENTS

| | | |
|---|---|---|
| 2009/0184962 A1 | 7/2009 | Kuriakose et al. |
| 2009/0241110 A1 | 9/2009 | Heo et al. |
| 2011/0119418 A1 | 5/2011 | Barron et al. |
| 2011/0161482 A1 | 6/2011 | Bonola et al. |
| 2013/0030786 A1 | 1/2013 | Halim et al. |
| 2013/0120251 A1 | 5/2013 | Lee et al. |
| 2013/0138860 A1 | 5/2013 | Moore |
| 2013/0219060 A1 | 8/2013 | Sturgeon et al. |
| 2013/0346479 A1 | 12/2013 | Vilke et al. |
| 2014/0130042 A1 | 5/2014 | Luxenberg et al. |
| 2014/0184622 A1 | 7/2014 | Xia |
| 2014/0244860 A1 | 8/2014 | A.R. |
| 2015/0091837 A1 | 4/2015 | Srinivasan |

*Primary Examiner* — Joni Richer
(74) *Attorney, Agent, or Firm* — Isidore PLLC (57) ABSTRACT

A method, video processing system, and information handling system (IHS) provides rendering of video data. The method includes triggering a management controller to generate a virtual monitor that is accessible by a host. The method further includes, in response to the processor writing video data to the video driver, the video data is converted to bulk video data. The bulk video data is transmitted to the management controller, and the management controller causes a virtual monitor driver corresponding to the virtual monitor to convert the bulk video data to a re-converted video data.

21 Claims, 5 Drawing Sheets

RENDERING VIDEO DATA IN AN INFORMATION HANDLING SYSTEM BY CONVERTING THE VIDEO DATA TO BULK VIDEO DATA

RELATED APPLICATION

This application is a continuation of U.S. patent application Ser. No. 14/719,554, filed May 22, 2015, the content of which is fully incorporated herein by reference.

BACKGROUND

1. Technical Field

The present disclosure generally relates to information handling systems and in particular to a system and a method for rendering video data in an information handling system.

2. Description of the Related Art

As the value and use of information continue to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

One example of an information handling system is a server, which is typically dedicated to running one or more services as a host on a network. The advent of cloud computing in recent years has made the use of servers increasingly common. As a result, it is not unusual for hundreds, if not thousands, of servers to be deployed in a given data center. Historically, servers were locally managed by an administrator through a shared keyboard, video display, and mouse. Over time, remote management capabilities evolved to allow administrators to monitor, manage, update and deploy servers over a network connection.

One example of these capabilities is the use of a remote access controller (RAC), which is coupled to or embedded within the server and remotely accessed by an administrator via a communication link. The RAC can have a processor, memory, network connection, and access to the system bus of the server. The RAC can be integrated into the motherboard of a server. The RAC provides management facilities that allow administrators to deploy, monitor, manage, configure, update, troubleshoot and remediate the server from any location.

The use of a RAC for remote management of a server in a data center can be advantageous. However, it can also present challenges. For example, some operating systems such as Linux and Windows disable graphic processing units and unload operating system drivers when the central processing unit does not detect a display or monitor connection. This renders the graphic processing units inoperable. This is a problem for servers with graphic processing units because many data centers do not have displays. When the graphic processing unit is disabled, video rendering occurs on the central processing unit, hampering the overall server performance and also limiting supported video resolutions.

BRIEF SUMMARY

Disclosed are a method, a video processing system, and an information handling system (IHS) for rendering video data in an IHS that includes a host and a management controller, with the host configured with a processor, a graphics processing unit (GPU), and a video driver. The method includes triggering the management controller to generate a virtual monitor that is accessible by the host and enabling the GPU. The processor of the host determines if video data is being written to the video driver. In response to the processor writing video data to the video driver, the video data is converted to bulk video data. The bulk video data is transmitted to the management controller, and the management controller causes a virtual monitor driver corresponding to the virtual monitor to convert the bulk video data to a re-converted video data.

According to another embodiment, the video processing system includes a management controller and a host communicatively coupled to the management controller. The host has a processor. The processor has firmware executing thereon that configures the processor to trigger the management controller to generate a virtual monitor that is accessible by the host. The processor enables the GPU. The management controller also determines and/or detects if the processor of the host is writing video data to a video driver. In response to the processor writing video data to the video driver, the video data is converted to bulk video data by the processor. The bulk video data is transmitted to the management controller, and the management controller causes a virtual monitor driver corresponding to the virtual monitor to convert the bulk video data to a re-converted video data.

According to an additional embodiment, the IHS includes a management controller and a processor communicatively coupled to the management controller. The processor has firmware executing thereon that configures the processor to trigger the management controller to generate a virtual monitor that is accessible by the processor. The processor enables the GPU and determines if the processor of the host is writing video data to a video driver. In response to the processor writing video data to the video driver, the video data is converted to bulk video data by the processor. The bulk video data is transmitted to the management controller, and the management controller causes a virtual monitor driver corresponding to the virtual monitor to convert the bulk video data to a re-converted video data.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

The illustrative embodiments provide a method, a video processing system, and an IHS for rendering video data in an IHS that includes a host and a management controller, with the host configured with a processor, a graphics processing unit (GPU), and a video driver.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

Figure 1:
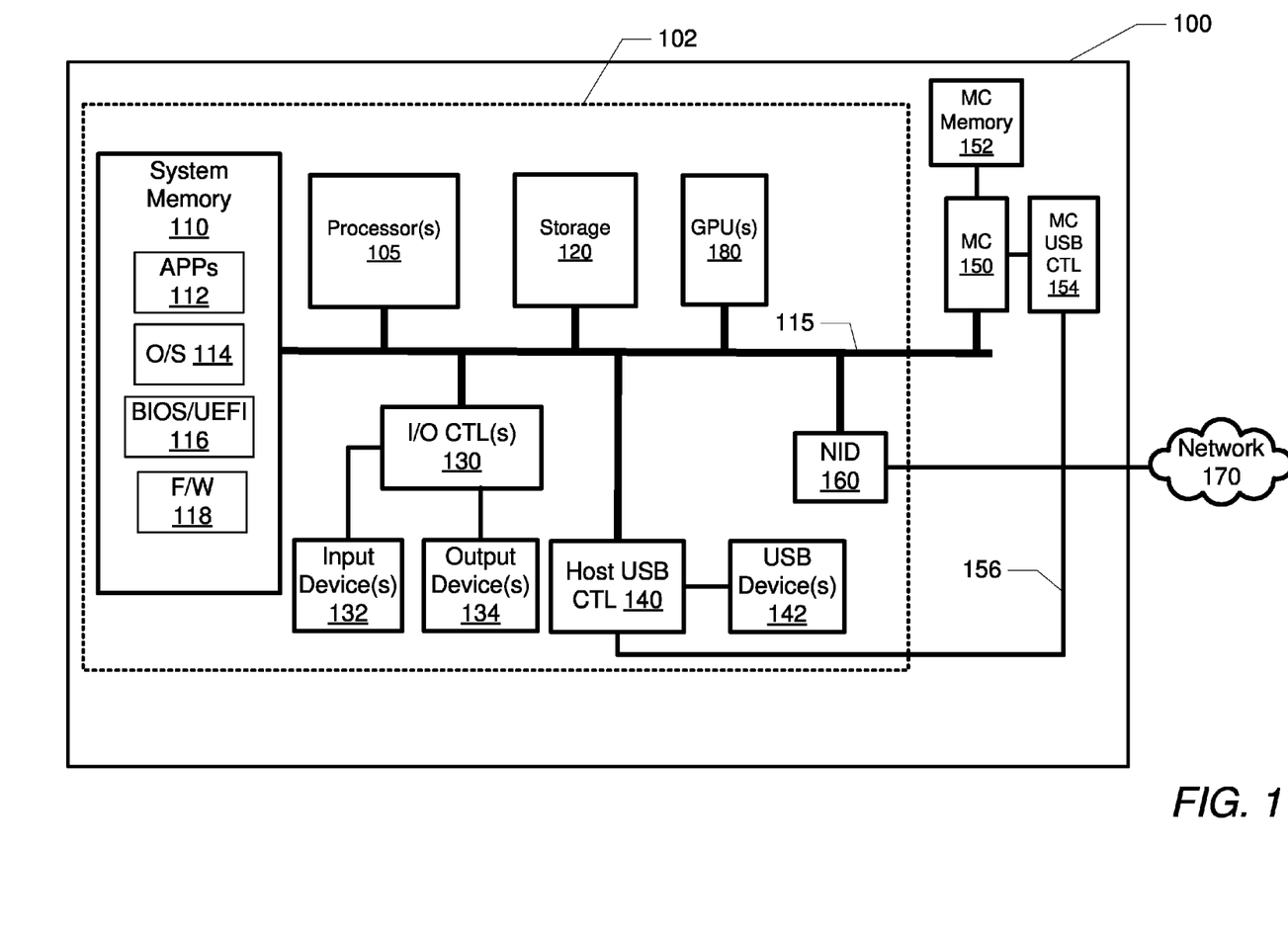
FIG. 1 illustrates one example of an information handling system (IHS) including a host and a management controller within which various aspects of the disclosure can be implemented, according to one or more embodiments.

FIG. 1 illustrates a block diagram representation of an example information handling system (IHS) 100, within which one or more of the described features of the various embodiments of the disclosure can be implemented. For purposes of this disclosure, an information handling system, such as IHS 100, may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a handheld device, personal computer, a server, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring specifically to FIG. 1, example IHS 100 includes a host 102 and a management controller (MC) 150. MC 150 is coupled to host 102 via system interconnect 115. MC 150 provides management functions that allow an administrator to deploy, monitor, manage, configure, update, troubleshoot and remediate host 102.

IHS 100 further includes one or more processors, such as processor(s) 105. Processor(s) 105 is coupled to system memory 110 via system interconnect 115. System interconnect 115 can be interchangeably referred to as a system bus, in one or more embodiments. Also coupled to system interconnect 115 is storage 120 within which can be stored one or more software and/or firmware modules and/or data (not specifically shown). In one embodiment, storage 120 can be a hard drive or a solid state drive. The one or more software and/or firmware modules within storage 120 can be loaded into system memory 110 during operation of IHS 100. As shown, system memory 110 can include therein a plurality of software and/or firmware modules including application(s) 112, operating system (O/S) 114, basic input output system/unified extensible firmware interface (BIOS/UEFI) 116 and firmware (F/W) 118. In one or more embodiments, BIOS/UEFI image 116 comprises the additional functionality associated with UEFI and can include UEFI images and drivers. The various software and/or firmware modules have varying functionality when their corresponding program code is executed by processor(s) 105 or other processing devices within IHS 100.

IHS 100 further includes one or more input/output (I/O) controllers 130 which support connection by, and processing of signals from, one or more connected input device(s) 132, such as a keyboard, mouse, touch screen, or microphone. I/O controllers 130 also support connection to and forwarding of output signals to one or more connected output device(s) 134, such as a monitor or display device or audio speaker(s). IHS 100 also includes one or more host universal serial bus (USB) controllers 140 which support connection by, and processing of signals from, one or more connected USB device(s) 142, such as printers, a mouse, monitors or external storage devices.

MC 150 is also coupled to MC memory 152. It is appreciated that MC memory 152 can, in other implementations, be an integral part of and/or exist within MC 150. Management controller 150 monitors and controls the operation of IHS 100 and other systems and devices communicatively coupled to IHS 100. Management controller 150 can also perform configuration and remote control of other connected IHSes. Management controller 150 is also coupled to system memory 110 via system interconnect 115. Certain software and/or firmware modules stored in system memory 110 can be executed by processor(s) 105. Software and/or firmware modules stored in MC memory 152 can be executed by MC 150. Processor(s) 105 and MC 150 include specific firmware that enables processor(s) 105 and MC 150 to perform the various functions described herein. MC 150 is coupled to a MC USB controller 154. MC USB controller 154 is communicatively coupled to host USB controller 140 via a USB bus 156. MC 150 can send data and instructions to and receive data and instructions from host 102 via USB bus 156.

IHS 100 further comprises a network interface device (NID) 160. NID 160 enables IHS 100 to communicate and/or interface with other devices, services, and components that are located external to IHS 100. These devices, services, and components can interface with IHS 100 via an external network, such as example network 170, using one or more communication protocols. In one embodiment, a customer provisioned system/platform can comprise multiple devices located across a distributed network, and NID 160 enables IHS 100 to be connected to these other devices. Network 170 can be a local area network, wide area network, personal area network, and the like, and the connection to and/or between network and IHS 100 can be wired or wireless or a combination thereof. For purposes of discussion, Network 170 is indicated as a single collective component for simplicity. However, it is appreciated that network 170 can comprise one or more direct connections to other devices as well as a more complex set of interconnections as can exist within a wide area network, such as the Internet.

IHS 100 also includes one or more graphic processing unit(s) (GPU(s)) 180 coupled to system interconnect 115. GPU(s) 180 support rendering of video data received from processor(s) 105. In one embodiment, GPU(s) 180 can be one or more printed circuit cards or integrated circuits that support the processing of video data. GPU(s) 180 is a specialized electronic circuit designed to rapidly manipulate and alter memory to accelerate the creation of images in a frame buffer intended for output to a display.

Figure 2:
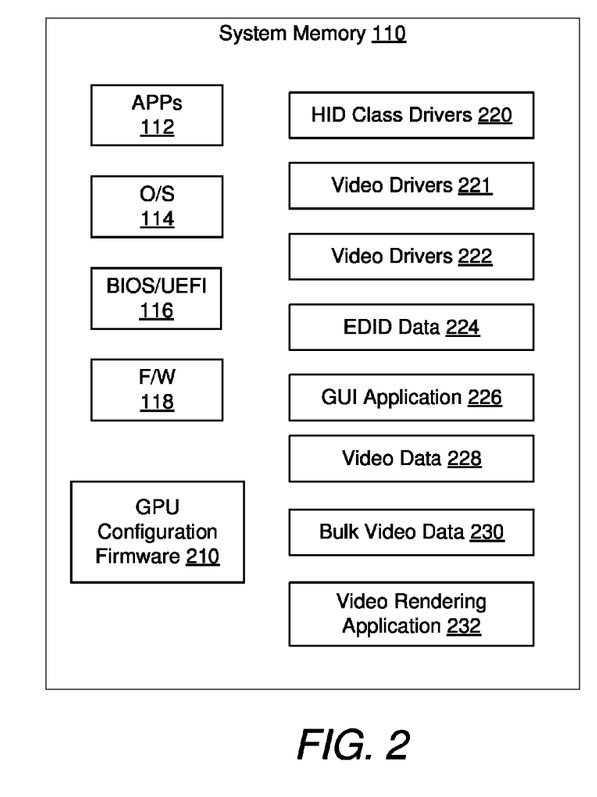
FIG. 2 illustrates example contents of a host system memory that includes software and firmware to support rendering of video data, in accordance with one embodiment.

With reference now to FIG. 2, one embodiment of example contents of system memory 110 of IHS 100 is shown. In the description of FIG. 2, reference is also made to specific components illustrated within FIG. 1. System memory 110 includes data, software, and/or firmware modules including application(s) 112, operating system (O/S) 114, BIOS/UEFI 116 and firmware (F/W) 118. System memory 110 also includes GPU configuration firmware module 210 that enables rendering of video data by GPU(s) 180. GPU configuration firmware module 210 enables GPU(s) 180 and prevents the disabling of GPU(s) 180 and the unloading of video drivers when a connection to a monitor or display is not detected.

System memory 110 further includes human interface device (HID) class drivers 220, video drivers 221 and 222, extended display identification data (EDID) 224 and graphical user interface (GUI) application 226. HID class drivers 220 are hardware device software that can operate a large number of different devices of a broadly similar type. For example, HID class drivers 220 can include drivers for USB monitors that share a USB protocol. Video drivers 221 are software and/or firmware module that allow processor(s) 105 and O/S 114 to render video data and interface with a display independently of GPU(s) 180 when GPU(s) 180 is turned off or disabled. Video drivers 222 are software and/or firmware modules that allow processor(s) 105 and O/S 114 to interface with GPU(s) 180. Video drivers 222 allow processor(s) 105 and O/S 114 to access hardware functions of GPU(s) 180 without needing to know precise details of the hardware. Extended display identification data (EDID) 224 is a data structure provided by a monitor or display to describe its capabilities to a GPU such as GPU(s) 180. EDID data 224 includes manufacturer name and serial number, product type, phosphor or filter type, timings supported by the display, display size, luminance data and pixel mapping data. GUI application 226 is a software and/or firmware module that allows users to interact with a monitor through graphical icons and visual indicators using input devices 132 (FIG. 1) such as a mouse.

System memory 110 also stores video data 228, bulk video data 230 and video rendering application 232. Video data 228 contains information to be shown on a display. Bulk video data 230 is video data 228 that has been converted by processor(s) 105 to a USB bulk transfer format. Video rendering application 232 is a software and/or firmware module that executes on GPU(s) 180 and renders video data 228 for display on a monitor.

Figure 3:
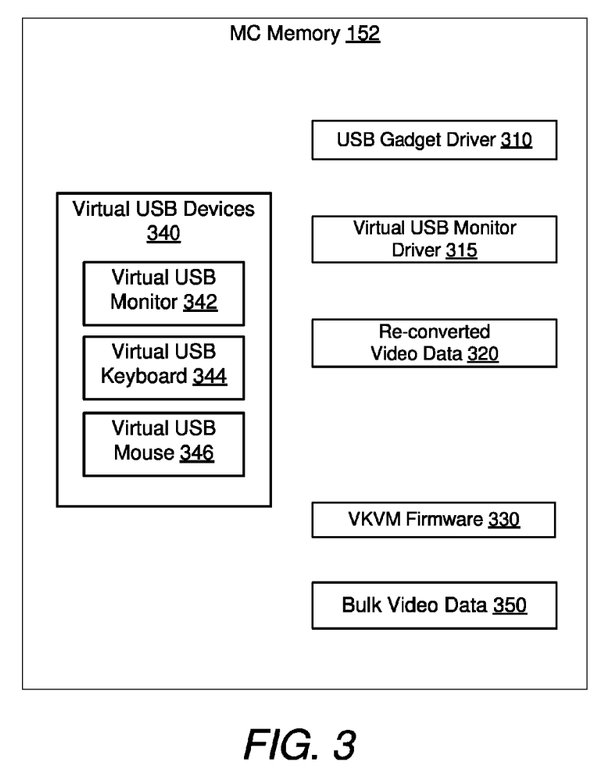
FIG. 3 illustrates example contents of a management controller memory that includes software and firmware to support rendering of video data, in accordance with one embodiment.

Referring to FIG. 3, one embodiment of example contents of MC memory 152 of IHS 100 is shown. In the description of FIG. 3, reference is also made to specific components illustrated within FIGS. 1 and 2. MC memory 152 stores bulk video data 350, USB gadget driver 310, virtual USB monitor driver 315, re-converted video data 320 and virtual keyboard, video and mouse (VKVM) firmware module 330. Bulk video data 350 is a copy of bulk video data 230 that has been received from processor(s) 105. USB gadget driver 310 is a software and/or firmware module that allows MC 150 to interface with various types of peripheral USB devices, such as a monitor, via MC USB controller 154 (see FIG. 1). Virtual USB monitor driver 315 is a software and/or firmware module that allows MC 150 to interface with a virtual monitor. Re-converted video data 320 is bulk video data 230 that has been converted by MC 150 back to video data (e.g. video buffer). VKVM firmware module 330 provides virtual keyboard, monitor, and mouse functions allowing a user remote access and control of IHS 100.

MC memory 152 further stores virtual USB devices 340. Virtual USB devices 340 include a virtual USB monitor 342, a virtual USB keyboard 344 and a virtual USB mouse 346.

MC 150 executing USB gadget driver 310 can generate virtual USB monitor 342, virtual USB keyboard 344 and virtual USB mouse 346.

Figure 4:
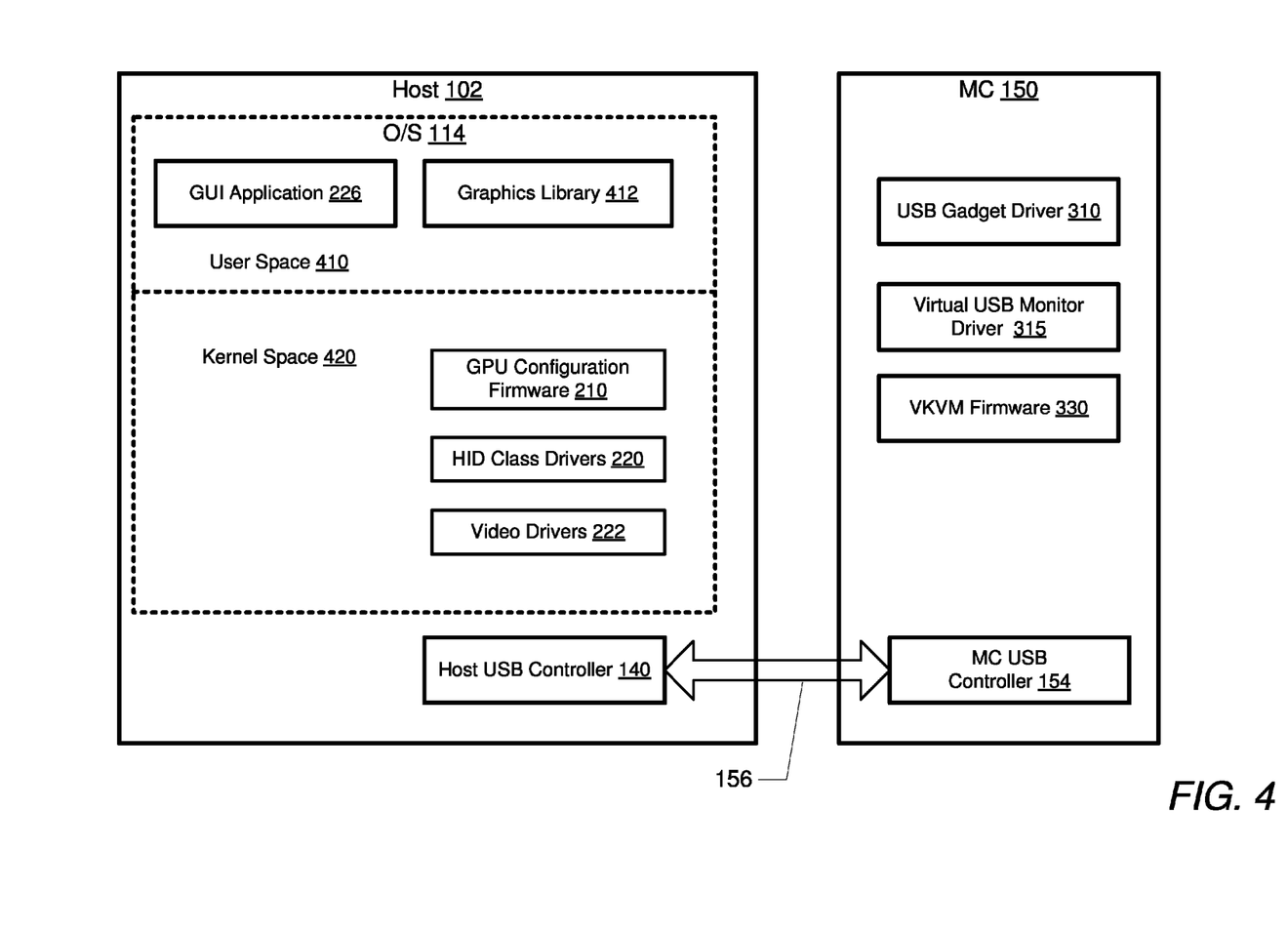
FIG. 4 illustrates a diagram of software and/or firmware modules executing on the IHS, according to one or more embodiments.

FIG. 4 illustrates a diagram of software and/or firmware modules executing within IHS 100. In the description of FIG. 4, reference is also made to specific components illustrated within FIGS. 1-3. Host 102 includes O/S 114 operating on processor(s) 105. O/S 114 has virtual memory that is segregated into a user space 410 and a kernel space 420. Kernel space 420 is the virtual memory area reserved for running privileged kernel, kernel extensions, and some device drivers. User space 410 is the memory area used by application software. GUI application 226 and graphics library 412 run in user space 410. Graphics library 412 is a program library designed to aid in rendering computer graphics to a monitor. This typically involves providing optimized versions of functions that handle common rendering tasks. GPU configuration firmware module 210, HID class drivers 220 and video drivers 222 run in kernel space 420.

MC 150 includes several software software/firmware programs executing thereon including USB gadget driver 310, virtual USB monitor driver 315 and VKVM firmware 330. Host 102 includes a host USB controller 140, and MC 150 includes a MC USB controller 154. Host USB controller 140 and MC USB controller 154 are communicatively coupled via a USB bus 156. USB bus 156 allows communication between host 102 and MC 150 that is separate from communications between host 102 and MC 150 via system interconnect 115. VKVM firmware 330 executing on MC 150 can emulate one or more virtual USB devices 340 on USB bus 156.

In one embodiment, IHS 100 includes processor(s) 105 executing GPU configuration firmware module 210 and MC 150 executing VKVM firmware module 330. GPU configuration firmware module 210 executing on processor(s) 105 triggers MC 150 to generate a virtual USB monitor (device) 342 that is accessible by the host 102. Processor(s) 105 determines if the processor(s) 105 is writing video data 228 to video drivers 222 (i.e., if the processor receives or executes a received command or instruction that initiates or triggers writing video data 228 to video drivers 222). In response to processor(s) 105 writing video data 228 to video drivers 222, the processor(s) 105 converts video data 228 into bulk video data 230. The bulk video data 230 is transmitted to the MC 150 via USB bus 156. MC 150 converts the bulk video data 230 to re-converted video data 320. With the functionality provided to generate a virtual USB monitor 342, processor(s) 105, executing GPU configuration firmware module 210, prevents the O/S 114 from disabling GPU(s) 180 and from unloading video drivers even though a physical connection to a monitor or display was not detected during start-up of IHS 100.

Those of ordinary skill in the art will appreciate that the hardware and software/firmware components and basic configuration depicted in FIGS. 1-4 and described herein may vary. For example, the illustrative components within IHS 100 (FIG. 1) are not intended to be exhaustive, but rather are representative to highlight components that can be utilized to implement aspects of the present disclosure. For example, other devices/components may be used in addition to or in place of the hardware depicted. The depicted example does not convey or imply any architectural or other limitations with respect to the presently described embodiments and/or the general disclosure.

Figure 5:
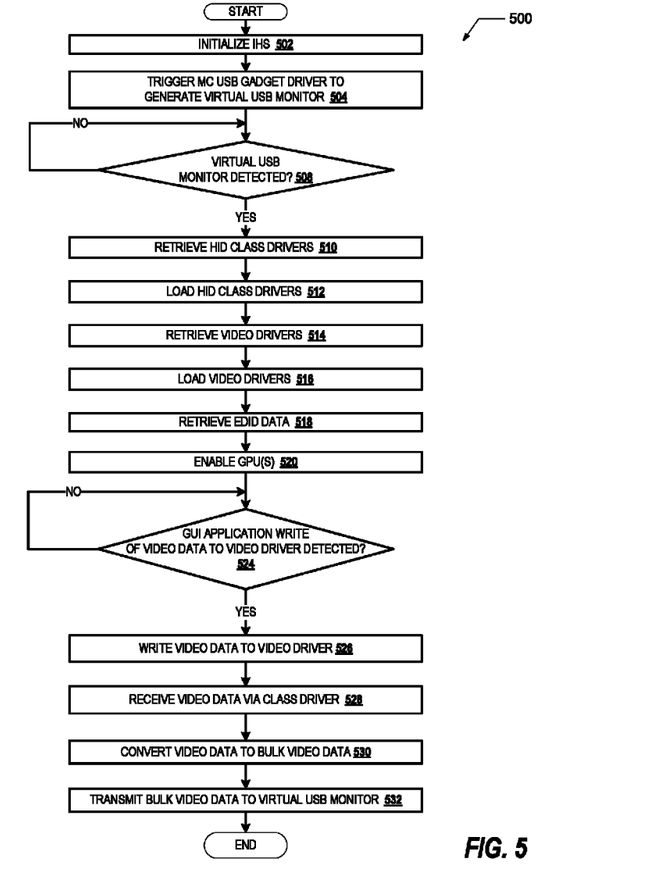
FIG. 5 is a flow chart illustrating one example by which a host implements a method for rendering video data.
Figure 6:
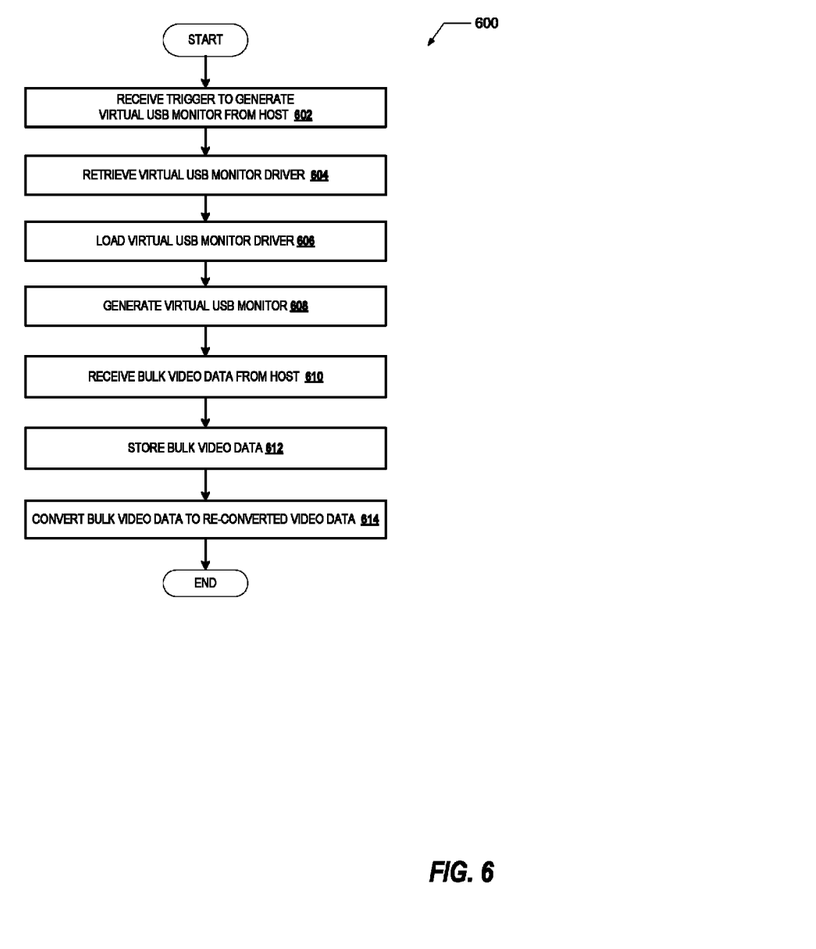
FIG. 6 is a flow chart illustrating an example by which a management controller implements a method for generating a virtual monitor.

FIGS. 5 and 6 illustrate flowcharts of exemplary methods 500 and 600 by which processor(s) 105 and MC 150 within the preceding figures perform different aspects of the processes that enable the one or more embodiments of the disclosure. Generally, methods 500 and 600 collectively represent computer-implemented methods for rendering video data within IHS 100. Method 500 represents a computer-implemented method by which processor(s) 105 enable rendering of video data by GPU(s) 180. Method 600 represents a computer-implemented method by which MC 150 enables generation of a virtual USB monitor 342. The description of methods 500 and 600 are provided with general reference to the specific components illustrated within the preceding FIGS. 1-4. Generally, method 500 is described as being implemented via processor(s) 105 and particularly the execution of code provided by GPU configuration firmware 210 within processor(s) 105. Generally, method 600 is described as being implemented via management controller 150 and particularly the execution of code provided by VKVM firmware 330 within management controller 150. It is however appreciated that certain aspects of the described methods may be implemented via other processing devices and/or execution of other code.

Referring now to the flow chart of FIG. 5, method 500 begins at the start block and proceeds to block 502 where processor(s) 105 initializes IHS 100 during start-up. Initialization of IHS 100 includes the loading of BIOS/UEFI 116, O/S 114, F/W 118 and GPU configuration software 210 by processor(s) 105. At block 504, processor(s) 105 triggers MC 150 to execute USB gadget driver 310 to generate virtual USB monitor 342. Specifically, in one embodiment, processor(s) 105 transmits instructions to MC 150 via system interconnect 115 to generate a virtual USB monitor 342. Processor(s) 105 can execute GPU configuration firmware 210 during start-up in order to trigger MC 150 to generate virtual USB monitor 342. At decision block 508, processor(s) 105 determines if a virtual USB monitor 342 has been detected. In response to no virtual USB monitor 342 being detected, method 500 returns to block 508 to continue detecting for a virtual USB monitor 342.

In response to virtual USB monitor 342 being detected, processor(s) 105 retrieves at least one HID class driver 220 corresponding to the virtual USB monitor 342 from system memory 110 (block 510) and loads the corresponding HID class drivers 220 (block 512). Processor 105 retrieves at least one video driver 222 from system memory 110 (block 514) and loads the video drivers 222 (block 516). Processor(s) 105 retrieves EDID data 224 corresponding to virtual USB monitor 342 from system memory 110 (block 518). The EDID data 224 provides video driver 222 with data regarding supported resolutions, refresh rates and pixel mapping data for virtual USB monitor 342. At block 520, processor(s) 105, executing video drivers 222, enables the operation of GPU(s) 180 such that GPU(s) 180 can process and render video data. GPU(s) 180 receives video data from processor(s) 105 via the execution of O/S 114.

At decision block 524, processor(s) 105 determines whether graphical user interface application 226 is initiating the writing of video data 228 to video drivers 222. In response to graphical user interface application 226 not writing video data 228 to video drivers 222, method 500 returns to block 524 to continue monitoring for when graphical user interface application 226 writes video data 228 to video drivers 222. In response to the detection of graphical user interface application 226 initiating the writing of video data 228 to video drivers 222, processor(s) 105 writes the video data 228 to video driver 222 (block 526). Processor(s) 105 receives the video data 228 via the HID class drivers 220 (block 528).

Processor(s) 105 converts the video data 228 to bulk video data 230 (block 530). Processor(s) 105 transmits the bulk video data 230 to MC 150 for use by virtual USB monitor 342 (block 532). The bulk video data 230 is transmitted to the virtual USB monitor 342 via host USB controller 140, USB bus 156 and MC USB controller 154. Processor(s) 105 sends video data to both GPU(s) 180 (via the execution of O/S 114) and to MC 150 (via the execution of GPU configuration firmware 210). Method 500 then ends.

Method 500 enables the generation of a virtual USB monitor 342 and processor(s) 105, executing GPU configuration firmware module 210, prevents the O/S 114 from disabling GPU(s) 180 and from unloading video drivers even though a physical connection to a monitor or display was not detected during the start-up of IHS 100.

Referring to the flow chart of FIG. 6, method 600 begins at the start block and proceeds to block 602 where MC 150 receives a trigger from host 102 to generate a virtual USB monitor 342 via execution of USB gadget driver 310. At block 604, MC 150 retrieves virtual USB monitor driver 315 from MC memory 152 and loads virtual USB monitor driver 315 (block 606). The virtual USB monitor 342 is generated at block 608. MC 150 receives the bulk video data 230 transmitted from host 102 (block 610) and stores the received bulk video data 230 as bulk video data 350 to MC memory 152 (block 612). MC 150 re-converts the bulk video data 230 to re-converted video data 320 (block 614) using virtual USB monitor driver 315. MC 150 reconstructs the received actual video data 228 (e.g. frame buffer) via execution of virtual USB monitor driver 315. Method 600 then ends.

In one embodiment, when the virtual USB monitor driver 315 executing on MC 150 receives the bulk video data 350, the virtual USB monitor driver 315 re-constructs the actual video buffer (e.g. VNC based frame buffer). Optionally, this could be handed off to an offload hardware engine (not shown) for further optimization such as compression.

The present disclosure provides several advantages during the operation of IHS 100. In particular, processor(s) 105 executing GPU configuration firmware module 210 enables GPU(s) 180 in a monitor-less system by triggering generation of a virtual monitor. Further, in one embodiment, execution of GPU configuration firmware module 210 by processor(s) 105 prevents GPU(s) 180 from being disabled during O/S 114 initialization and also prevents the unloading of video drivers when a physical connection to a monitor or display is not detected during start-up of IHS 100. In another embodiment, the disabled GPU is enabled and the relevant video drivers loaded after startup once the processor execution of GPU configuration firmware module 210 occurs. The GPU configuration firmware module 210 can be executed as a part of the O/S 114 or firmware during startup or automatically triggered to execute immediately following startup of the IHS 100 or manually triggered by an administrator of the connected MC.

In the above described flow chart, one or more of the methods may be embodied in a computer readable medium containing computer readable code such that a series of functional processes are performed when the computer readable code is executed on a computing device. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, such as a service processor, or other programmable data processing apparatus to produce a machine, such that the instructions, which execute via the processor of the computer or other programmable data processing apparatus, performs the method for implementing the functions/acts specified in the flowchart and/or block diagram block or blocks.

One or more of the embodiments of the disclosure described can be implementable, at least in part, using a software-controlled programmable processing device, such as a microprocessor, digital signal processor or other processing device, data processing apparatus or system. Thus, it is appreciated that a computer program for configuring a programmable device, apparatus or system to implement the foregoing described methods is envisaged as an aspect of the present disclosure. The computer program may be embodied as source code or undergo compilation for implementation on a processing device, apparatus, or system. Suitably, the computer program is stored on a carrier device in machine or device readable form, for example in solid-state memory, magnetic memory such as disk or tape, optically or magneto-optically readable memory such as compact disk or digital versatile disk, flash memory, etc. The processing device, apparatus or system utilizes the program or a part thereof to configure the processing device, apparatus, or system for operation.

As will be further appreciated, the processes in embodiments of the present disclosure may be implemented using any combination of software, firmware or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A computer-implemented method for rendering video data in an information handling system (IHS), the method comprising:
    triggering a management controller that is communicatively coupled to a host of the IHS to generate a virtual monitor that is accessible by the host;
    in response to a processor writing video data to a video driver, converting the video data to bulk video data; and
    transmitting the bulk video data to the management controller, wherein the management controller executes a virtual monitor driver corresponding to the virtual monitor to convert the bulk video data to a re-converted video data.

2. The method of claim 1, wherein the management controller is communicatively coupled with the processor via a universal serial bus (USB).

3. The method of claim 1, further comprising:
    loading, via the management controller, at least one gadget driver, wherein the management controller causes the gadget driver to generate the virtual monitor.

4. The method of claim 1, further comprising:
    loading, via the management controller, the virtual monitor driver corresponding to the virtual monitor.

5. The method of claim 1, further comprising:
    enabling, via a processor of the host, at least one graphics processing unit (GPU) within the host;
    detecting at least one virtual universal serial bus (USB) monitor; and
    in response to detecting the at least one virtual USB monitor, enabling the GPU to render the video data.

6. The method of claim 1, further comprising:
    retrieving at least one human interface device (HID) class driver as the virtual monitor driver;
    loading the HID class driver; and
    emulating the virtual monitor using the HID class driver.

7. The method of claim 1, further comprising:
    the processor converting the video data to bulk video data by using extended device identification data (EDID) corresponding to the virtual monitor.

8. A video processing system comprising:
    a management controller;
    a host communicatively coupled to the management controller, the host having a processor, the processor having firmware executing thereon that configures the processor to:
        trigger the management controller to generate a virtual monitor that is accessible by the host;
        in response to the processor writing video data to the video driver, convert the video data to bulk video data; and
        transmit the bulk video data to the management controller, wherein the management controller executes a virtual monitor driver corresponding to the virtual monitor to convert the bulk video data to a re-converted video data.

9. The video processing system of claim 8, wherein the management controller is communicatively coupled with the processor via a universal serial bus (USB).

10. The video processing system of claim 8, wherein the firmware further configures the processor to:
    load, via the management controller, at least one gadget driver, wherein the management controller causes the gadget driver to generate the virtual monitor.

11. The video processing system of claim 8, wherein the firmware further configures the processor to:
    load, via the management controller, the virtual monitor driver corresponding to the virtual monitor.

12. The video processing system of claim 8, wherein the firmware further configures the processor to:
    enable at least one graphics processing unit (GPU) within the host;
    detect at least one virtual universal serial bus (USB) monitor;
    determine if the at least virtual USB monitor has been detected; and
    in response to the at least one virtual USB monitor being detected, enable the GPU to render the video data.

13. The video processing system of claim 8, wherein the firmware further configures the processor to:
    retrieve at least one human interface device (HID) class driver as the virtual monitor driver;
    load the HID class driver; and
    emulate the virtual monitor using the HID class driver.

14. The video processing system of claim 8, wherein the firmware further configures the processor to:

retrieve extended device identification data (EDID) from a storage device, the EDID corresponding to the virtual monitor device; and
convert the video data to bulk video data by using the EDID.

15. An information handling system (IHS) comprising:
a management controller;
a processor communicatively coupled to the management controller, the processor having firmware executing thereon, wherein the firmware configures the processor to:
trigger the management controller to generate a virtual monitor that is accessible by the processor;
in response to the processor writing video data to the video driver, convert the video data to bulk video data; and
transmit the bulk video data to the management controller, wherein the management controller causes a virtual monitor driver corresponding to the virtual monitor to convert the bulk video data to a re-converted video data.

16. The IHS of claim 15, wherein the management controller is communicatively coupled with the processor via a universal serial bus (USB).

17. The IHS of claim 15, wherein the firmware further configures the processor to:
load, via the management controller, at least one gadget driver, wherein the management controller causes the gadget driver to generate the virtual monitor.

18. The IHS of claim 15, wherein the firmware further configures the processor to:
load, via the management controller, a virtual monitor driver corresponding to the virtual monitor.

19. The IHS of claim 15, wherein the firmware further configures the processor to:
enable at least one graphics processing unit (GPU);
detect at least one virtual universal serial bus (USB) monitor;
determine if the at least virtual USB monitor has been detected; and
in response to the at least one virtual USB monitor being detected, enable the GPU to render the video data.

20. The IHS of claim 15, wherein the firmware further configures the processor to:
retrieve at least one human interface device (HID) class driver as the virtual monitor driver;
load the HID class driver; and
emulate the virtual monitor using the HID class driver.

21. The IHS of claim 15, wherein the firmware further configures the processor to:
retrieve extended device identification data (EDID) from a storage device, the EDID corresponding to the virtual monitor device; and
convert the video data to bulk video data by using the EDID.

* * * * *